(No Model.)

F. PIDGEON.
DITCHING MACHINE.

No. 258,596. Patented May 30, 1882.

WITNESSES:
Theo. G. Hoster
C. Sedgwick

INVENTOR:
F. Pidgeon
BY Munn & Co
ATTORNEYS.

UNITED STATES PATENT OFFICE.

FRANCIS PIDGEON, OF SAUGERTIES, NEW YORK, ASSIGNOR TO M. E. PIDGEON, OF SAME PLACE.

DITCHING-MACHINE.

SPECIFICATION forming part of Letters Patent No. 258,598, dated May 30, 1882.

Application filed September 2, 1881. (No model.)

*To all whom it may concern:*

Be it known that I, FRANCIS PIDGEON, of Saugerties, in the county of Ulster and State of New York, have invented a new and Improved Ditching-Machine, of which the following is a full, clear, and exact description.

The invention relates to that class of ditching machinery adapted for making narrow ditches for drain-pipes.

The invention consists in a method of propelling the platform, and in combining with it instrumentalities as hereinafter described.

Reference is to be had to the accompanying drawings, forming part of this specification, in which similar letters of reference indicate corresponding parts in all the figures.

Figure 1:
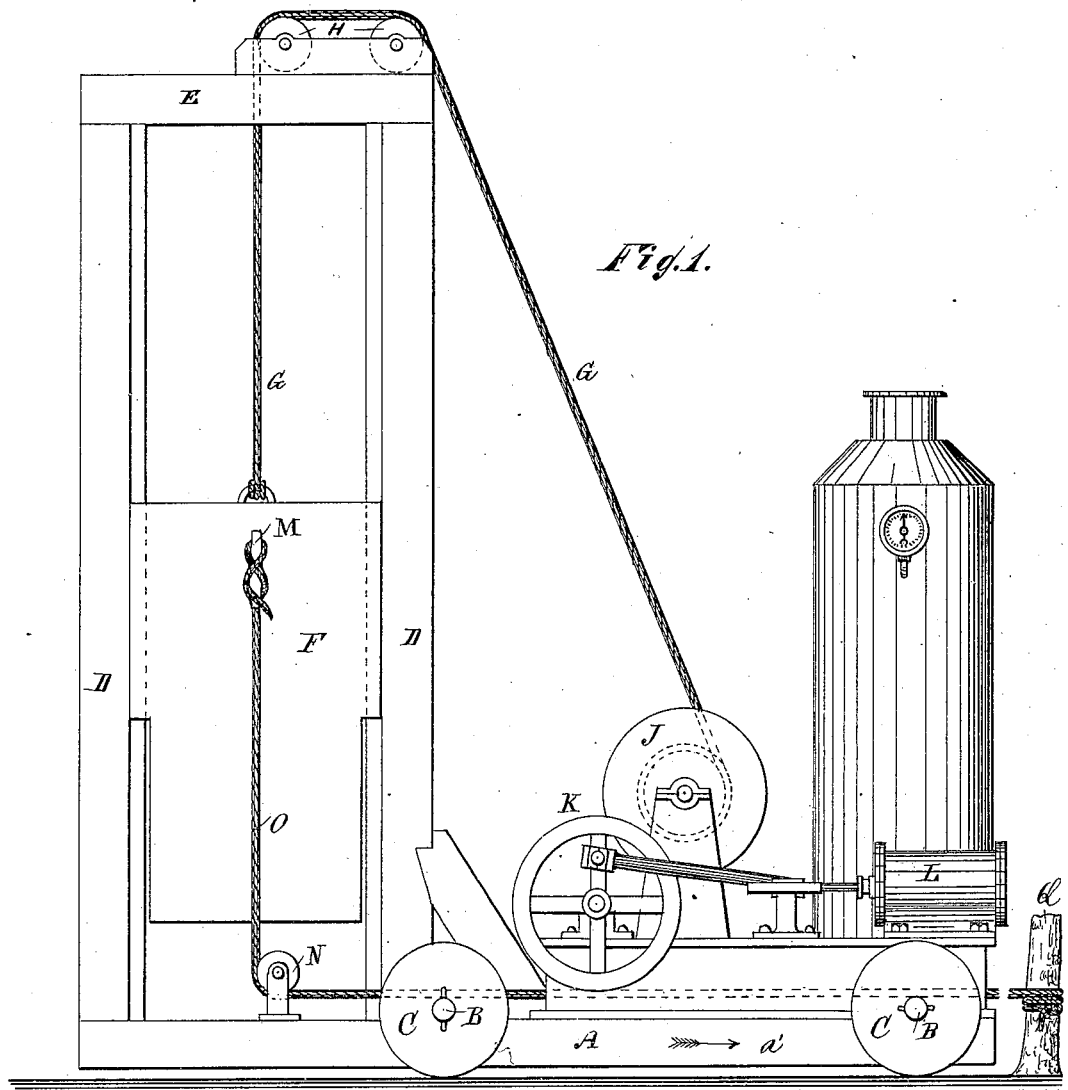
Figure 2:
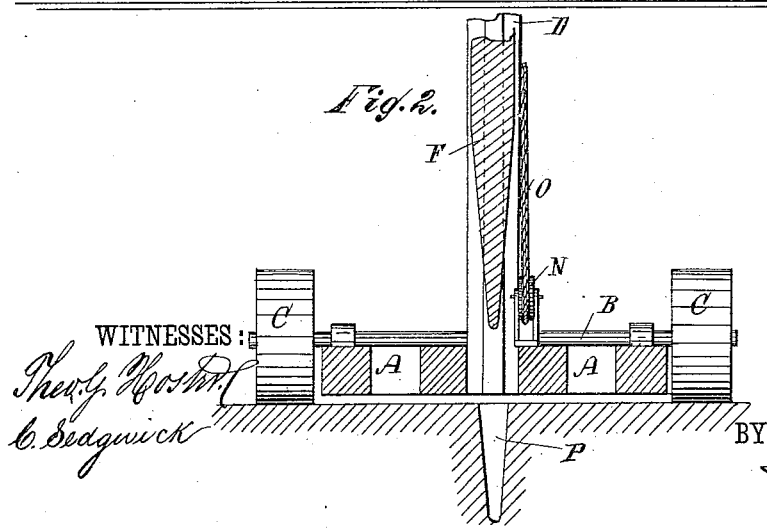

Figure 1 is a longitudinal elevation of my improved ditching-machine. Fig. 2 is a cross-sectional elevation of the lower part of the same.

A platform, A, is supported by a series of axles or shafts, B, resting on broad wheels or rollers C. This platform carries at one end a vertical guide-frame composed of the uprights D, united by a top cross-piece, E, which frame is parallel with the length of the platform A. A heavy or weighted drop-knife, F, provided with a lower tapering cutting-edge, slides vertically between the uprights, and is attached to a rope, G, passing over pulleys H on the top of the guide-frame, and is wound on a drum, J, of a windlass, K, which may be operated by a steam-engine, L, or by hand-power, or any other suitable power. This drum J is provided with a clutch for throwing it in and out of gear, as the circumstances may require. A cleat, *m*, is fastened to the side of the sliding knife F, and a pulley, N, is provided on the platform A, at the base of the vertical guide-frame. A rope, O, attached to a tree, Q, or some other object, passes over the pulley N, and, when attached to the cleat M, can be used to propel the platform A in a manner that will be described hereinafter.

The operation is as follows: The drop-knife F is raised and dropped in the same manner as the ramming-block of a pile-driver is raised and dropped, and as this knife F has a considerable weight it cuts a narrow and tapering trench, P, in the ground. The earth is not scraped or scooped out, but is pressed and jammed to the sides. According to the resistance presented by the ground and the nature of the same, more or less cuts by the knife F will be required to form a ditch having a certain cross-section. When a portion of the ditch or trench equal to the width of the knife F is completed the platform A may be moved in the direction of the arrow $a'$. To accomplish this very conveniently and rapidly, the rope O, which is fastened to a tree or post, Q, or other suitable fixed object some distance in front of the platform, is passed around the pulley N, and is fastened to the cleat M when the knife or cutter F is in the lowered position. If the knife is now raised, the length of rope between the pulley N and the tree or post Q must necessarily be shortened—that is, the platform A is moved in the direction of the arrow $a'$ a distance equal to the distance the knife F is raised by the windlass.

I am aware that a drop-knife has been used in ditching-machines for the same purpose, and has been raised by a cord passing over pulleys at the top of frame; but

What I claim as new and of my invention is—

1. In a ditching-machine, the combination, with the platform A, of the uprights D, the drop-knife F, the rope G, the windlass K, the rope O, the pulley N, and the cleat M, substantially as herein shown and described, and for the purpose set forth.

2. The method, substantially as herein shown and described, of propelling the platform A, carrying a drop-knife, consisting in attaching the end of the rope O, passing through a pulley, N, to the knife F, when the same is lowered, and then raising this knife, as set forth.

FRANCIS PIDGEON.

Witnesses:
P. M. GILLESPY,
PIERRE ST. J. GILLESPY.